June 18, 1968 D. B. SHAW 3,389,294

IMAGING SYSTEM IN WHICH THE SIZE AND CENTERING OF THE RASTER ARE KEPT CONSTANT

Filed Feb. 28, 1964 4 Sheets-Sheet 1

United States Patent Office 3,389,294

Patented June 18, 1968

3,389,294

IMAGING SYSTEM IN WHICH THE SIZE AND CENTERING OF THE RASTER ARE KEPT CONSTANT

David B. Shaw, White Plains, N.Y., assignor to Hazeltine Research Inc., a corporation of Illinois Filed Feb. 28, 1964, Ser. No. 348,031
14 Claims. (Cl. 315—19)

ABSTRACT OF THE DISCLOSURE

An imaging system, such as a TV type camera, for converting an electromagnetic image into an electrical signal representative of the image by converting the electromagnetic image into an electrical image and sequentially scanning the electrical image with a raster. The electrical image is bordered by a reticle in the form of a series of fine lines or solid bands either imaged thereupon or etched onto the target. The reticle is scanned with the electrical image representative of the electromagnetic image and the portion of the electrical signal which results from scanning the reticle is separated from the remainder of the signal by frequency or time separation. The extent of overlapping on each side of the raster is determined and compared with a signal representative of the desired extent of overlapping in order to regulate the size of the raster. The extent of overlapping along one side of the raster is compared with the extent of overlapping along the opposite side of the raster in order to control the centering of the raster.

The present invention relates to an imaging system in which an electromagnetic image is converted to an electrical signal representative of the image. More particularly, the present invention relates to such a system in which the size and centering of the scanning raster used to perform the aforementioned conversion are maintained constant.

One type of imaging system heretofore proposed utilizes electrical feedback to stabilize the deflection signals used to develop the scanning raster. It is assumed therein that by stabilizing these deflection signals the size and centering of the raster will be maintained constant. The image tube, however, is not included within the electrical feedback loop. Such an omission may cause the size and the centering of the raster to vary, even though the deflection signals are stabilized. This results from the fact that associated with the image tube are certain electrical and electromechanical parameters which are subject to variations independent of the variations in the deflection signals—the voltages applied to the accelerating and decelerating electrodes of the image tube, for example. If, in addition, the raster is developed by electrostatic deflection techniques, any initial misalignment or any subsequent shifting of one plate of a deflection pair with respect to the other plate of that pair may also cause the size and centering of the raster to vary. The substitution of magnetic deflection techniques for electrostatic deflection techniques to develop the raster would not simplify matters any since temperature changes in the deflection coils of the deflection mechanism may also cause the size and centering of the raster to vary. Even if the image tube were included within the electrical feedback loop, there would be no certainty that the size and centering of the raster would remain constant. This is so because the stabilization of the electrical deflection signals depends upon electrical references which, in turn, may themselves vary.

It will be apparent from the foregoing discussion that the difficulties encountered with prior art imaging systems result from their dependence on electrical references which are not constant but which are capable of varying. As a result of these variations, the electrical signal produced by the system may not be an accurate representation of the electromagnetic image.

It is an object of the present invention, therefore, to provide a new and improved imaging system which maintains the size and centering of the scanning raster constant, independent of all parameter variations both physical and electrical.

It is another object of the present invention to provide such an imaging system which is based on a physical, rather than an electrical, reference.

Thus, in accordance with the present invention, there is provided an imaging system which comprises: means for converting an electromagnetic image into an electrical signal representative of the image by converting the electromagnetic image into an electrical image and by sequentially scanning the electrical image; means for supplying deflection signals to the converting means to develop a raster used to perform the sequential scanning, the raster so developed having at least one dimensional characteristic which may vary undesirably; means for providing as part of the electrical image a frame in the form of a reticle bordering desired areas of the electrical image, the frame being adapted to be in an overlapping relationship with at least one side of the raster; means for deriving from the electrical signal representative of the image electrical signals indicative of the extent of overlapping of the frame by the raster; comparison means utilizing the signals indicative of the extent of overlapping of the frame by the raster for developing a plurality of control signals representative of the variations of the raster; and means for coupling the control signals to the deflection signal supply means to prevent the variations so as to provide accurate scanning of the desired areas of the electrical image by the raster.

For a better understanding of the present invention together with other and further objects thereof, reference is had to the following description taken in connection with the accompanying drawings, and its scope will be pointed out in the appended claims.

Referring to the drawings:

FIG. 1 is a block diagram of an imaging system constructed in accordance with the present invention;

FIGS. 2*a* and 2*b* show two forms of optical reticles which may be used in association with the image tube of the imaging system of FIG. 1 to produce an electrical signal indicative of the variations in the size and centering of the raster;

Figure 1:
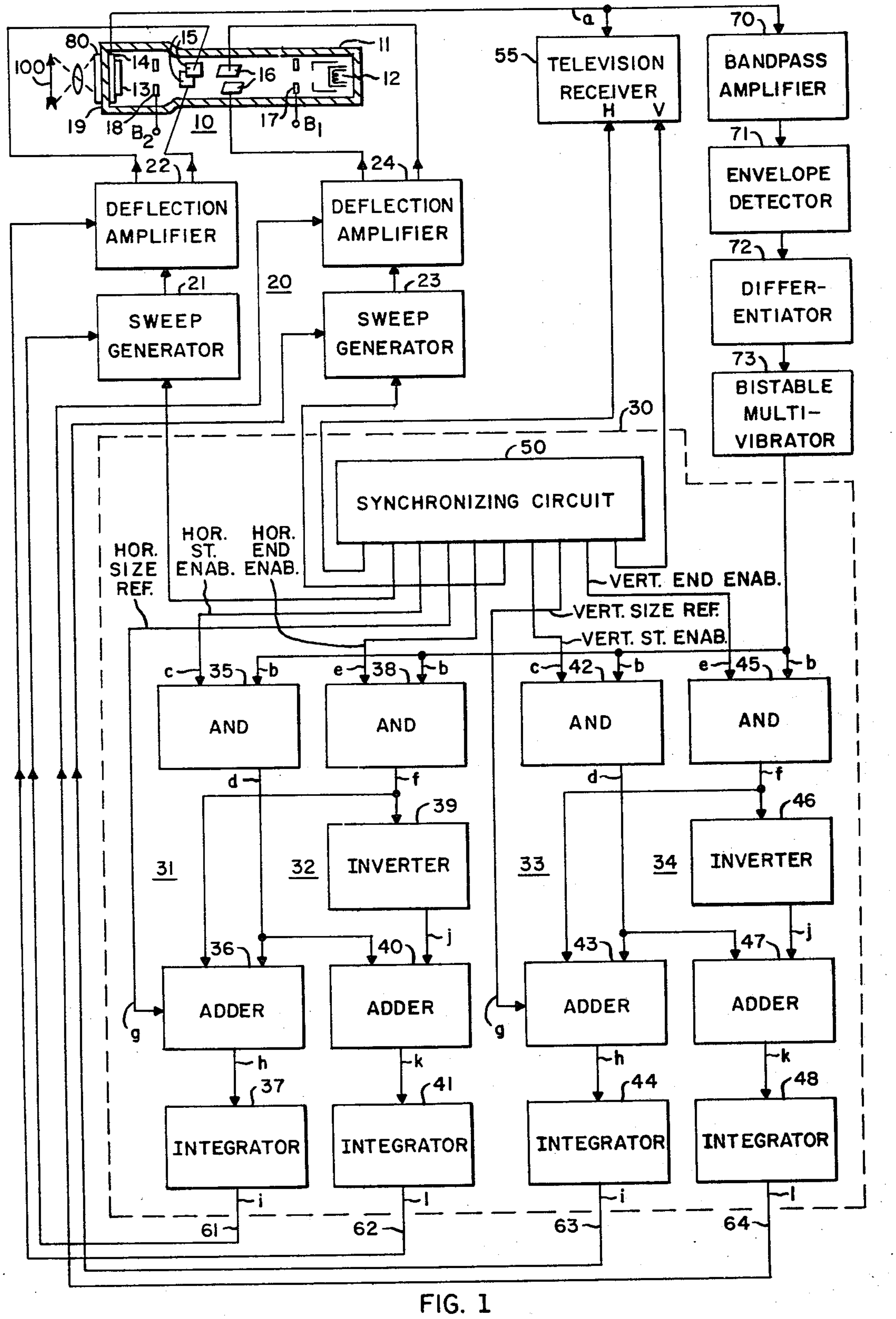

*Description and operation of the imaging system of FIG. 1*

Although the teachings of the present invention are applicable in many different types of imaging systems which utilizes a scanning raster to produce an electrical signal from an electrical image, the imaging system will be described as it would be used in a television type display system, an environment in which it is particularly useful. In such an environment, the imaging system represents a television pickup device, or camera tube, and its associated electrical circuitry which together convert an optical image into an electrical signal representative of the image. The electrical signal is then communicated to a television receiver which recreates the optical image from the electrical signal received and which displays that image on the face of a picture tube or other display device.

Referring now to FIG. 1, the imaging system there represented includes image sensor means 10 for converting an optical image into a stored electrical image which when sequentially scanned produces an electrical signal in response thereto. Means 10 includes an image tube 11 having an electron gun 12, a photosensitive target 13, a target ring 14, electrostatic deflecting plate pairs 15 and 16, an accelerating electrode 17 connected to a source of operating potential $B_1$, and a decelerating electrode 18 connected to a source of operating potential $B_2$. The electron beam produced by the electron gun 12 is directed by electrodes 17 and 18 towards the target 13, upon which is stored the electrical image. Image tube 11 is specifically shown in FIG. 1 as a vidicon, although, in general, any type of sequentially scanned image tube may be used.

The imaging system also includes means 20 for supplying deflection signals to image tube 11 to develop a raster from the electron beam. Means 20 includes a first sweep generator-deflection amplifier combination 21, 22 for supplying signals to plates 15 of tube 11 to deflect the electron beam in a horizontal direction. Means 20 also includes a second sweep generator-deflection amplifier combination 23, 24 for supplying signals to plates 16 of tube 11 to deflect the electron beam in a vertical direction. The raster developed by these deflection signals scans the target 13 in the well known manner. As was previously mentioned, the size and centering of the raster may vary as either of the electrode potentials $B_1$ and $B_2$ vary and/or as the spatial orientation of either of the plates of the electrostatic deflection plate pairs 15 and 16 vary and/or as the concentricity of the electron beam entering the deflection field varies. Such variations in the size and centering of the raster generally reduces the usefulness of the imaging system.

The imaging system additionally includes means associated with the image tube 11 for producing an electrical signal in response to the variations in the size and centering of the raster. This means includes a reticle used to form a frame bordering the electrical image stored on the photosensitive target 13. The reticle may be part of the image tube 11, as where it is engraved onto its face plate 19, or it may be external to the image tube 11, as where it is held either in front of the face plate 19, or attached thereto, or imaged thereon. In either case, however, the reticle is imaged onto the target 13 to form the frame. Another arrangement which may be used is one where the reticle is engraved onto the target 13 itself, in which case, the reticle and the frame will be one and the same. In any event, the configuration of the frame will be the same as the configuration of the reticle. The reticle dimensions are so chosen that when the frame is formed on the target 13 the frame will be overlapped by the raster and will produce an electrical signal indicative of the overlapping. As the nature and extent of the overlapping of the frame by the raster varies, the electrical signals produced by the frame also varies.

The imaging system further includes means 30 responsive to the electrical signals produced by the frame for deriving a plurality of control signals representative of the size and centering variations of the raster. Means 30 includes comparator circuits 31, 32, 33, and 34 which develop a horizontal size control signal, a horizontal centering control signal, a vertical size control signal, and a vertical centering control signal, respectively. Circuit 31, includes a two input AND circuit 35, an adder circuit 36, and an integrator circuit 37, connected in series and in the order mentioned. Circuit 32 includes a two input AND circuit 38, an inverter circuit 39, an adder circuit 40 and an integrator circuit 41, also connected in series and in the order mentioned. Circuit 33 includes a two input AND circuit 42, an adder circuit 43, and an integrator circuit 44, connected in that order. Circuit 34 includes a two input AND circuit 45, an inverter circuit 46, an adder circuit 47, and an integrator circuit 48, also connected in that order.

Figure 9:
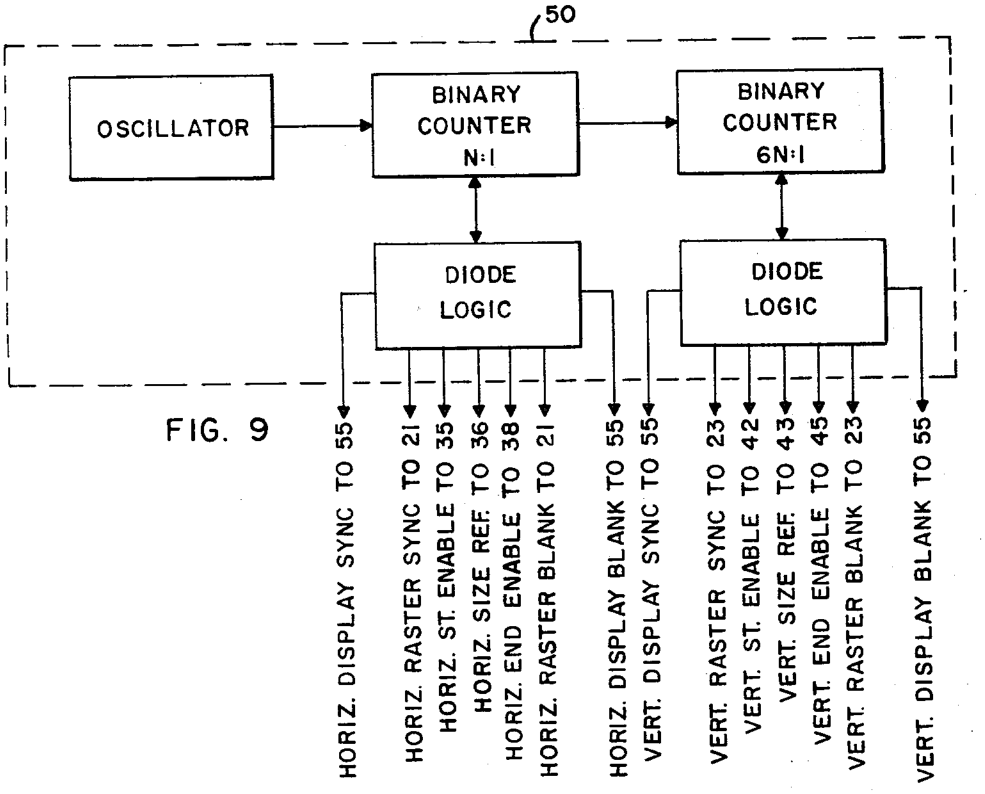
FIG. 9 is a block diagram of a synchronizing circuit used in the imaging system of FIG. 1.

Means 30 also includes a synchronizing circuit 50 connected to the comparator circuits 31–34 for supplying enabling and reference pulses to be used by the units therein in developing the size and centering control signals. Circuit 50 is also connected to sweep generators 21 and 23 for supplying timing signals used to synchronize the horizontal and vertical scan of the image tube 11 to the horizontal and vertical scan of the television receiver 55. A block diagram of such a synchronizing circuit is shown in FIG. 9.

The imaging system finally includes means, such as conductors 61–64, for coupling the control signals developed by means 30 to the deflection signal supply means 20 to prevent the variations of the raster. Conductor 61 couples the control signal developed at the output of integrator 37 to the sweep generator 21 to prevent any variations in the horizontal size of the raster. Conductor 62 couples the control signal developed at the output of integrator 41 to the deflection amplifier 22 to prevent any variations in the horizontal centering of the raster. Conductor 63 couples the control signal developed at the output of integrator 44 to the sweep generator 23 to prevent any variations in the vertical size of the raster. Conductor 64 couples the control signal developed at the output of integrator 48 to the deflection amplifier 24 to prevent any variations in the vertical centering of the raster.

The video signal produced as the raster scans across the target 13, or, more particularly, the video signal produced as the raster scans across the electrical image stored on the target 13, that image being a replica of the optical image of the scene to be televised 100, is coupled from target ring 14 through bandpass amplifier 70, envelope detector 71, differentiator 72, and bistable multivibrator 73 to one input of each of the AND circuits 35, 38, 42, and 45. The video signal is also coupled to television receiver 55.

Figure 2A:
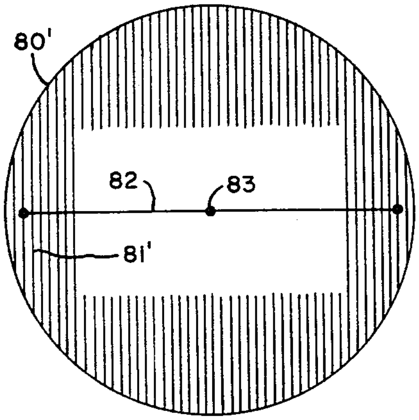

The operation of the imaging system will be described with reference to the manner in which the variations in the horizontal size and horizontal centering of the raster are prevented. The variations in the vertical size and vertical centering of the raster are prevented in a like manner. In considering the operation, it will be assumed that the reticle is attached to the face plate 19 of image tube 11 (notation 80 in FIG. 1). Reticle 80 may be a thin piece of glass having an index of refraction equal to the index of refraction of the face plate 19 and is cemented thereto with a matching index of refraction cement. Reticle 80 may be a grating of equally spaced vertical lines which is imaged onto the target in such a manner that the imaged grating lines are perpendicular to the direction of the horizontal scan of the raster. The configuration of the frame 80' (i.e., the configuration of the reticle imaged onto target 13) and the alignment of the grating lines of the frame 81' with one line of the raster 82 is shown in FIG. 2*a*.

The operation of the system can best be described with reference to the signal waveforms *a–l* shown in FIGS.

Figure 5:
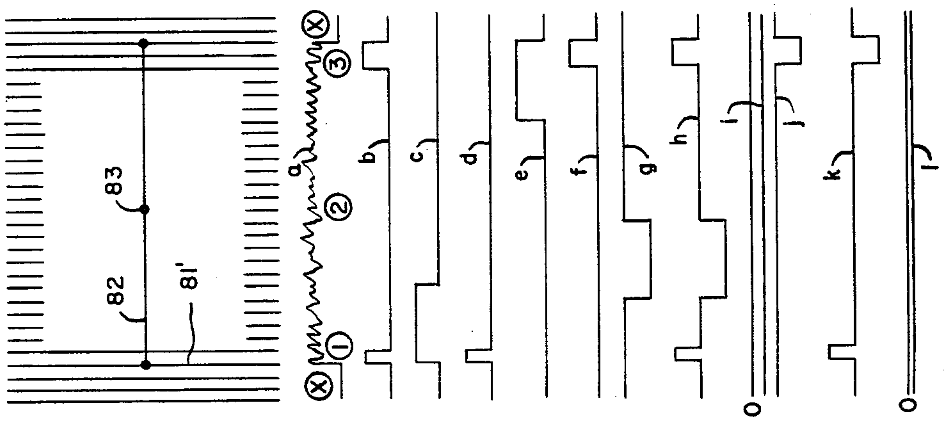
FIGS. 3–5 are a series of signal waveforms helpful in understanding the operation of the imaging system when using the reticle shown in FIG. 2*a*.
Figure 4:
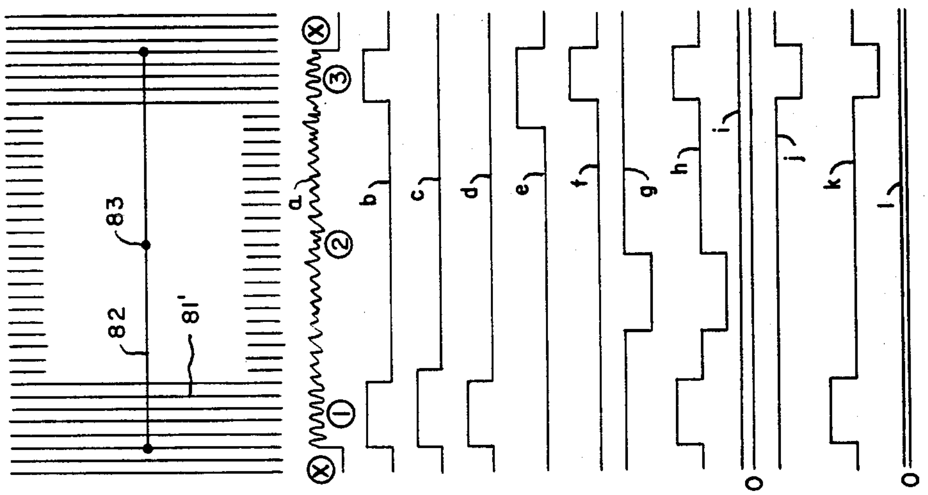
Figure 3:
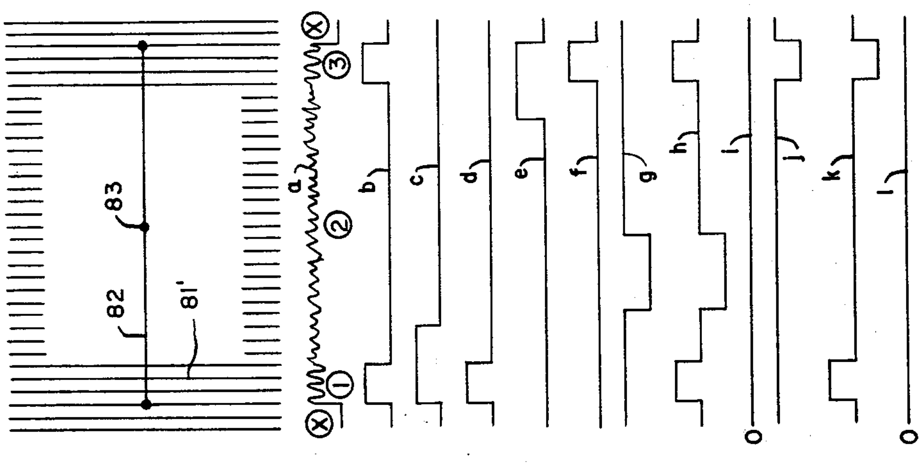

3, 4, and 5. FIG. 3 shows the signal waveforms *a–l* present at different points in the imaging system when the horizontal size and horizontal centering of the raster are correct. FIG. 4 shows the waveforms for the case where the raster is oversized and displaced to the left of the center of the frame 83. FIG. 5 shows the waveforms for the case where the raster is undersized and displaced to the right of the center of the frame, 83. In the discussion that follows, it will be assumed that the center of the frame 83, coincides with the center of the electrical image stored on target 13. To aid in the understanding of the invention, letter notations have been placed at various points in the imaging system of FIG. 1, at which points the signal waveforms of FIGS. 3–5 having the same letter notations appear.

In operation, assume that the horizontal size and centering of the raster are correct (FIG. 3). For this condition the raster scans across an equal number of grating lines both on the left and right hand sides of the frame 80′. Electrical signals are produced in response to the scanning by the raster of the spacing between the lines of the grating 81′ but no electrical signals are produced in response to the scanning by the raster of the lines of the grating themselves. The video signal appearing at the target ring 14 for the correct size—correct centering condition of the raster is shown by waveform *a* in FIG. 3—portion ① is the video signal produced as the raster scans across the grating lines on the left-hand side of the frame, i.e., at the start of the scan; portion ② is the video signal produced as the raster scans between the left and right-hand sides of the frame 80′ and which is to be displayed by receiver 55 (the desired areas of the electrical image stored on target 13); and portion ③ is the video signal produced as the raster scans across the right-hand side of the frame 80′, i.e., at the end of the scan. Portions ⓧ represent the retrace intervals of the video signal.

The frequency of the video signal produced as the raster scans across the frame 80′ (the frequency of the signal portions ① and ③) depends on the spacing of the grating lines and on the rate of the scan. The frame signal portions ① and ③ may be separated from the video signal portion ② by a bandpass amplifier 70. The frame signals thus separated are envelope detected by unit 71, differentiated by unit 72, and impressed upon multivibrator unit 73 which reproduces the waveform generated by the raster scan (FIG. 3, *b*). The pulses developed by the multivibrator 73 are then impressed upon one input of the two input AND circuits 35 and 38. Synchronizing circuit 50 supplies a "start enable" pulse (FIG. 3, *c*) to the second input of AND circuit 35, and an "end enable" pulse (FIG. 3, *e*) to the second input of AND circuit 38. The leading edge of the "start enable" pulse is in time synchronism with the start of the scan while the trailing edge of the "end enable" pulse is in time synchronism with the end of the scan. The time duration of these pulses is equal to twice the duration of the normal pulse developed by multivibrator 73, that pulse being developed when the scan size is correct.

The output pulse signal of AND circuit 35 (FIG. 3, *d*) represents the overlapping of the frame 80′ at the start of the raster scan while the output pulse signal of AND circuit 38 (FIG. 3, *f*) represents the overlapping of the frame 80′ at the end of the raster scan. These two pulse signals, along with a horizontal size reference pulse developed by synchronizing circuit 50 (FIG. 3, *g*), are supplied to adder 36, the output signal of which (FIG. 3, *h*) is supplied to integrator 37. The duration of the size reference pulse (FIG. 3, *g*) is such that for the raster condition assumed, the sum of the video pulse energies within the "start" and "end" frame pulse widths equals the energy of the size reference pulse but is of opposite polarity. The output of integrator 37 for the correct size condition is therefore 0 volts (FIG. 3, *i*).

The output pulse signal of AND circuit 38 (FIG. 3, *f*) is also applied to inverter 39 wherein it is reversed in polarity, the output pulse signal being shown as *j* in FIG. 3. This pulse along with the output pulse signal of AND circuit 35 (FIG. 3, *d*), is supplied to adder 40, the output signal of which (FIG. 3, *k*) is supplied to integrator 41. For the raster condition assumed, the video pulse energy within the "start" frame pulse width equals the video pulse energy within the "end" frame pulse width so that the output of integrator 41 for the correct centering condition is also 0 volt (FIG. 3, *l*).

When the scan size increases above normal (FIG. 4 for example), the raster overlaps more of the frame 80′ both on its left and right-hand sides. The video pulse energy within the "start" and "end" frame pulse widths increase (FIG. 4, *d* and 4, *f*) but the energy of the size reference pulse remains unchanged (FIG. 4, *g*). As a result, integrator 37 develops a positive D-C signal at its output (FIG. 4, *i*). This signal is applied to sweep generator 21 to decrease the amplitude of the deflection signal supplied to the plate 15 to decrease the size of the raster.

When the scan size decreases below normal, (FIG. 5 for example), the raster overlaps less of the frame 80′ both on its left and right-hand sides. The video pulse energy within the "start" and "end" frame pulse widths decrease (FIGS. 5, *d* and 5, *f*) but the energy of the size reference pulse again remains unchanged (FIG. 5, *g*). As a result, integrator 37 develops a negative D-C signal at its output (FIG. 5, *i*). This signal is applied to sweep generator 21 to increase the amplitude of the deflection signal supplied to the plates 15 to increase the size of the raster.

When the center of the raster drifts towards the left of the center of the frame, 83 (FIG. 4, for example), the raster overlaps more of the left-hand side of the frame 80′ than it does the right-hand side. The video pulse energy within the "start" frame pulse width (FIG. 4, *d*) therefore increases with respect to the video pulse energy within the "end" frame pulse width (FIG. 4, *f*). As a result, integrator 41 develops a positive D-C signal at its output (FIG. 4, *l*). This signal is applied to deflection amplifier 22 to vary the differential D-C value of the deflection signal supplied to the plates 15 in a direction to shift the center of the raster towards the right, i.e., in a direction to recenter the raster.

When the center of the raster drifts toward the right of the center of the frame, 83 (FIG. 5 for example), the raster overlaps more of the right-hand side of the frame, 80′ than it does the left-hand side. The video pulse energy within the "start" frame pulse width (FIG. 5, *d*) therefore decreases with respect to the video pulse energy within the "end" frame pulse width (FIG. 5, *f*). As a result integrator 41 develops a negative D-C signal at its output (FIG. 5, *l*). This signal is applied to deflection amplifier 22 to vary the differential D-C voltage of the deflection signal supplied to the plates 15 in a direction to shift the center of the raster towards the left, i.e., in a direction to recenter the raster.

The polarities of the D-C control signals developed by integrator circuits 37 and 41 for all conditions of horizontal size and centering variations are given in Table I below:

TABLE I

| Size | Centering | Size Integrator Circuit 37, Polarity | Centering Integrator Circuit 41, Polarity |
|---|---|---|---|
| Normal | Normal | 0 | 0 |
| Do | Offcenter-left | 0 | + |
| Do | Offcenter-right | 0 | − |
| Oversize | Normal | + | 0 |
| Do | Offcenter-left | + | + |
| Do | Offcenter-right | + | − |
| Undersize | Normal | − | 0 |
| Do | Offcenter-left | − | + |
| Do | Offcenter-right | − | − |

The vertical size and vertical centering control signals are developed in a manner similar to the manner in which the horizontal size and horizontal centering control signals are developed. The polarities of the control signals developed by the integrator circuits 44 and 48 for different conditions of vertical size and centering are summarized in Table II below:

TABLE II

| Size | Centering | Size Integrator Circuit 44, Polarity | Centering Integrator Circuit 48, Polarity |
|---|---|---|---|
| Normal | Normal | 0 | 0 |
| Do | Offcenter-up | 0 | + |
| Do | Offcenter-down | 0 | − |
| Oversize | Normal | + | 0 |
| Do | Offcenter-up | + | + |
| Do | Offcenter-down | + | − |
| Undersize | Normal | − | 0 |
| Do | Offcenter-up | − | + |
| Do | Offcenter-down | − | − |

Figure 2B:
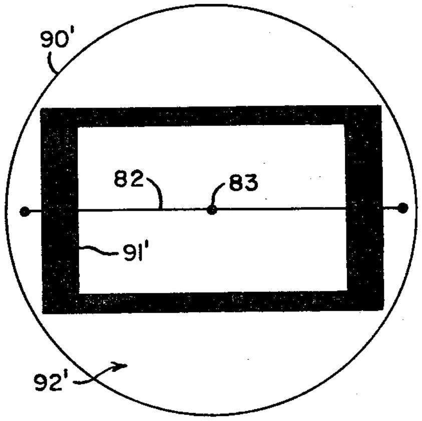

Referring to FIG. 2*b*, there is shown another form of frame (imaged reticle) 90′ which may be used to produce an electrical signal indicative of the variations in the size and centering of the raster. The actual reticle may, as before, be a thin piece of glass cemented to the face plate 19 of image tube 11 with a matching index of refraction cement. Frame 90′ differs from frame 80′ in that whereas frame 80′ consisted entirely of a vertical grating bordering that portion of the electrical image which is to be displayed, frame 90′ consists of a composite black and white band (91′ and 92′, respectively) which together border that portion of the electrical image which is to be displayed. The alignment of bands 91′ and 92′ with one line of the raster 82 is also shown in FIG. 2*b*. Electrical signals are produced in response to the scanning by the raster of the white band 92′ but no electrical signals are produced in response to the scanning by the raster of the black band 91′. Thus, when the raster scans across the target 13, and more particularly, when the raster scans across the frame 90′ and the stored electrical image, a video signal is produced having the general waveform shown in FIG. 6, waveform *a* for example—portion ① is the video signal produced as the raster scans across the left-hand side of the white band 92′, i.e., at the start of the scan; portion ② is the zero level produced as the raster scans across the left-hand side of the black band 91′; portion ③ is the video signal produced as the raster scans between the left- and right-hand sides of the black band 91′ and which is to be displayed by receiver 55 (the desired areas of the electrical image stored on target 13) portion ④ is the zero level produced as the raster scans across the right-hand side of the black band 91′; and portion ⑤ is the video signal produced as the raster scans across the right-hand side of the white band 92′, i.e., at the end of the scan. Portions ⓧ represent the retrace intervals of the video signal.

Referring back to waveform *a* in FIGS. 3–5, for a moment, it will be noted therefrom that there is no time separation between the signal produced as the raster scans across the frame 80′ (portions ① and ③) and the signal produced as the raster scans between the left and right-hand sides of the frame (the signal to be displayed, portion ②). In order to use the frame signals to develop the size and centering control signals, it was first necessary to separate the frame signals from the signal to be displayed in bandpass amplifier 70. Referring to waveform *a* in FIG. 6, however, it will be noted that the video signals produced at the ends of the raster (portions ① and ⑤) are already separated from the video signal to be displayed (portion ③) by the black band portions ② and ④. Thus, the video signal produced as the raster scans across the target 13 may be coupled directly from the target ring 14 to the AND circuits 35, 38, 42 and 45. In other words, by using the combination black and white band reticle instead of the vertical grating reticle, units 70–73 may be omitted from the imaging system of FIG. 1. It is apparent therefore that, whereas the imaging system using a vertical grating reticle utilizes both frequency and time separation for the size and centering control signals, the imaging system using the combination band reticle utilizes time separation only.

Figure 8:
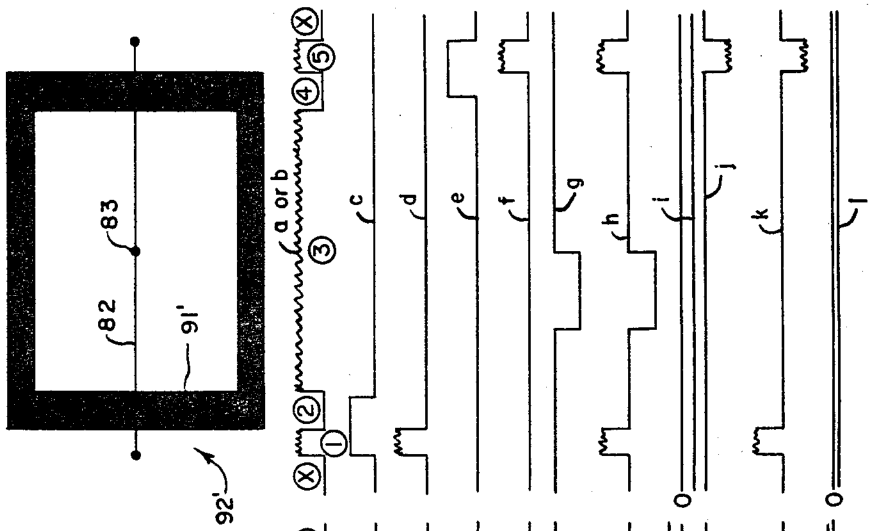
FIGS. 6–8 are a series of signal waveforms helpful in understanding the operation of the imaging system when using the reticle shown in FIG. 2*b*.
Figure 7:
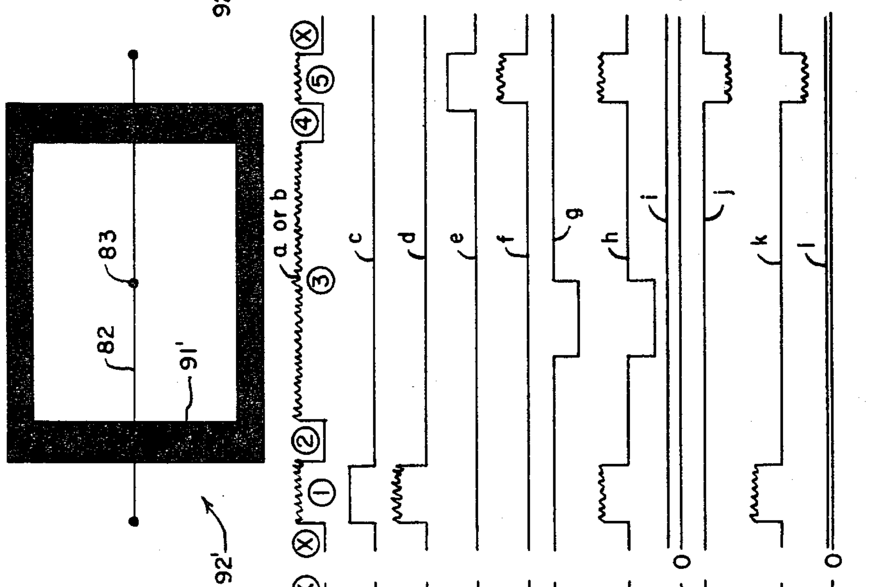
Figure 6:
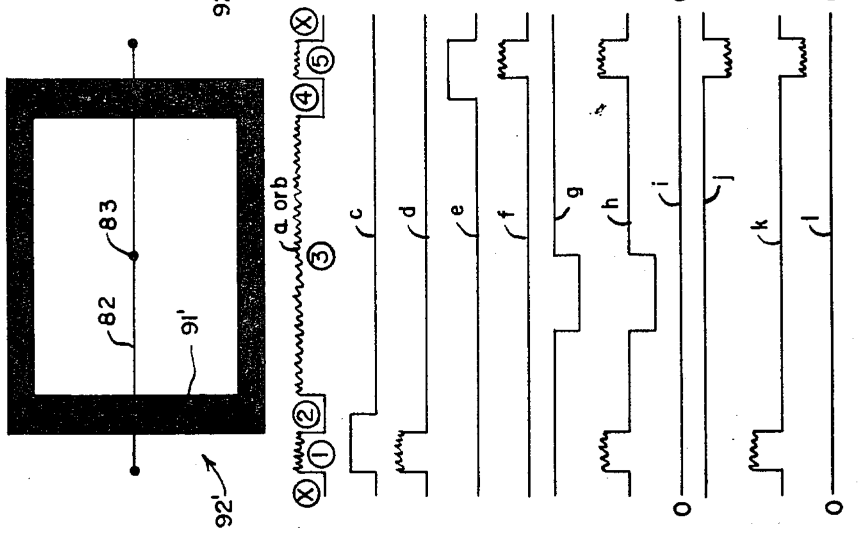

FIGS. 6, 7, and 8 and the waveforms *a–l* therein show the signals developed at the same points in the imaging system of FIG. 1 as were previously used for the correct size—correct centering condition, oversized—displaced left centering condition, and undersized—displaced right centering condition of the raster, respectively.

For the normal size—normal centering condition shown in FIG. 6, the raster scans beyond both sides of tht black band 91′ into the white band portion, a distance equal to the width of the black band. Since the rate of scan is constant along the length of the raster, the time durations of portions ①, ②, ④, and ⑤ in waveform *a* of FIG. 6 are all equal. The leading edge of the "start enable" pulse supplied by unit 50 is in time synchronism with the start of the scan while the trailing edge of the "end enable" pulse is in time synchronism with the end of the scan. The time duration of both the "start enable" and "end enable" pulses is 50% greater than the normal time duration of portions ①, ②, ④, or ⑤.

The size and centering control signals are derived from integrator circuits 37, 41, 44 and 48 in the previously described manner. The relationships expressed in Tables I and II for the vertical grating reticle also apply for the black and white band reticle.

To summarize then, for the correct raster size condition the sum of the video pulse energies within the "start" and "end" frame pulse widths (grating pulse widths or white band pulse widths) is just cancelled by the energy of the size reference pulse thereby producing zero volts output. When the raster size decreases below normal, the sum of the video pulse energies within the "start" and "end" frame pulse widths decrease below the energy of the size reference pulse, thereby producing a negative D-C signal output which is used to increase the respective deflection size. When the raster size increases above normal, the sum of the video pulse energies within the "start" and "end" frame pulse widths increases above the energy of the size reference pulse, thereby producing a positive D-C signal output which is used to decrease the respective deflection size. When the raster centering drifts toward the "start" side of the scan, the video pulse energy within the "start" frame pulse width increases with respect to the video pulse energy within the "end" frame pulse width, thereby producing a positive D-C signal output which is used to shift the raster toward the "end" side of the scan. When the raster centering drifts toward the "end" side of the scan, the video pulse energy within the "start" frame pulse width decreases with respect to the video pulse energy within the "end" frame pulse width, thereby producing a negative D-C signal output which is used to shift the raster towards the "start" side of the scan.

It will be evident from the foregoing description that the image tube is now included within the feedback loop. As a result of this inclusion, and as a result of using a physical reftrence in the form of a reticle, the size and centering of the scanning raster will be maintained constant, independent of system variations whether electrical, electro-mechanical, or mechanical and whether within or external to the image tube. Thus the raster will accurately scan that area of the stored electrical image which is to be displayed.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An imaging system comprising:

means for converting an electromagnetic image into an electrical signal representative of the image by converting the electromagnetic image into an electrical image and by sequentially scanning the electrical image;

means for supplying deflection signals to the converting means to develop a raster used to perform said sequential scanning, the raster so developed having at least one dimensional characteristic which may vary undesirably;

means for providing as part of said electrical image a frame in the form of a reticle bordering desired areas of the electrical image, said frame being adapted to be in an overlapping relationship with at least one side of the raster;

means for deriving from the electrical signal representative of the image electrical signals indicative of the extent of overlapping of said frame by the raster;

comparison means utilizing the signals indicative of the extent of overlapping of said frame by the raster for developing a plurality of control signals representative of the variations of the raster;

and means for coupling the control signals to the deflection signal supply means to prevent said variations so as to provide accurate scanning of the desired areas of the electrical image by the raster.

2. An imaging system comprising:

means for converting an optical image into an electrical image which when sequentially scanned produces an electrical signal output in response thereto;

means for supplying deflection signals to the converting means to develop a raster used to scan the stored electrical image, the raster so developed having at least one dimensional characteristic which may vary undesirably;

means for providing as part of said electrical image a frame in the form of a reticle bordering desired areas of the electrical image, said frame being adapted to be in an overlapping relationship with at least one side of the raster;

means for deriving from the electrical signal representative of the image electrical signals indicative of the extent of overlapping of said frame by the raster;

comparison means utilizing the signals indicative of the extent of overlapping of said frame by the raster for developing a plurality of control signals representative of the variations of the raster;

and means for coupling the control signals to the deflection signal supply means to prevent said variations so as to provide accurate scanning of the desired areas of the electrical image by the raster.

3. An imaging system comprising:

image sensor means for converting an optical image into a stored electrical image which when sequentially scanned produces an electrical signal in response thereto, said means including an electron gun and a photosensitive target toward which the electron beam produced from said gun is directed and upon which is stored the electrical image;

means for supplying deflection signals to the sensor means to develop a scanning raster from said beam, the raster so developed having at least one dimensional characteristic which may vary undesirably;

means for providing as part of said electrical image a frame in the form of a reticle bordering desired areas of the electrical image, said frame being adapted to be in an overlapping relationship with at least one side of the raster;

means for deriving from the electrical signal representative of the image electrical signals indicative of the extent of overlapping of said frame by the raster;

comparison means utilizing the signals indicative of the extent of overlapping of said frame by the raster for developing a plurality of control signals representative of the variations of the raster;

and means for coupling the control signals to the deflection signal supply means to prevent said variations so as to provide accurate scanning of the desired areas of the electrical image by the raster.

4. An imaging system comprising:

image sensor means for converting an optical image into a stored electrical image which when sequentially scanned produces an electrical signal in response thereto, said means including a vidicon type image tube having an electron gun, a photo-sensitive target toward which the electron beam produced from said gun is directed and upon which is stored the electrical image, an accelerating electrode, a decelerating electrode, a pair of horizontal electrostatic deflection plates, and a pair of vertical electrostatic deflection plates:

means for supplying first deflection signals to said horizontal electrostatic plates and second deflection signals to said vertical electrostatic plates to develop a scanning raster from said beam, the raster so developed having a tendency to vary undesirably in size and centering as the deflection signal supplied and the electrode supply voltages, vary, said means including a first deflection amplifier-sweep generator combination for supplying the horizontal deflection signals and a second deflection amplifier-sweep generator combination for supplying the vertical signals;

means associated with the image sensor means for producing an electrical signal in response to the variations of the raster, said means including a reticle cemented onto the faceplate of the vidicon type image tube and which when imaged onto the target of said tube forms a frame bordering desired areas of the stored electrical image, said frame being adapted to be in an overlapping relationship with at least one side of the raster;

means responsive to the electrical signal produced by said last-mentioned mean sincluding a first comparator circuit having a sum signal channel for deriving a first control signal representative of the variations in the horizontal size of the raster, a second comparator circuit also having a sum signal channel for deriving a second control signal representative of the variations in the vertical size of the raster, a third comparator circuit having a difference signal channel for deriving a third control signal representative of the variations in the horizontal centering of the raster, and a fourth comparator circuit also having a difference signal channel for deriving a control signal representative of the variations in the vertical centering of the raster;

and means for coupling the horizontal size control signal to the sweep generator of the first deflection amplifier-sweep generator combination, for coupling the vertical size control signal to the sweep generator in the second deflection amplifier-sweep generator combination, for coupling the horizontal centering control signal to the deflection amplifier in the first deflection amplifier-sweep generator combination, and for coupling the vertical centering control signal to the deflection amplifier in the second deflection amplifier-sweep generator combination whereby the size and centering variations of the scanning raster caused by variations in the deflection signals and by variations in the electrode supply voltages are prevented.

5. An imaging system according to claim 1 in which said frame is adapted to be in an overlapping relationship with the two sides of the raster parallel to a first axis and in which the comparison means includes a first comparator circuit for comparing signals representative of the extent of overlapping along a second axis, orthogonal to said first axis, with a signal representative of the desired extent of overlapping along said second axis for deriving control signals representative of the size of the raster along said second axis.

6. An imaging system according to claim 1 in which said frame is adapted to be in an overlapping relationship with the four sides of the raster and in which said comparison means includes a first comparator circuit for comparing the signals representative of the extent of overlapping along a $x$ coordinate axis with a signal indicative of the desired extent of overlap along the $x$ coordinate axis and a second comparator circuit for comparing the signals representative of the extent of overlapping along a $y$ coordinate axis with a signal indicative of the desired extent of overlapping along the $y$ coordinate axis for deriving control signals representative of the $x$ coordinate and $y$ coordinate scan size of the raster.

7. An imaging system according to claim 1 in which said frame is adapted to be in an overlapping relationship with at least the two sides of the raster parallel to a first axis and in which the comparison means includes a first comparator circuit for comparing signals representative of the extent of overlapping of the raster at opposite ends of said first axis for deriving control signals representative of the first axis centering of the raster.

8. An imaging system according to claim 1 in which said frame is adapted to be in an overlapping relationship with the four sides of the raster and in which the comparison means includes a first comparator circuit for comparing signals representative of the extent of overlapping of the raster at opposite ends of a $x$ coordinate axis and a second comparator circuit for comparing signals representative of the extent of overlapping at opposite ends of a $y$ coordinate axis for deriving control signals representative of the $x$ coordinate and $y$ coordinate centering of the raster.

9. An imaging system according to claim 1 in which said frame is adapted to be in an overlapping relationship with the two sides of the raster parallel to a first axis, and in which the comparison means includes a first comparator circuit for comparing signals representative of the extent of overlapping along a second axis, orthogonal to said first axis, with a signal representative of the desired extent of overlapping along said second axis and a second comparator circuit for comparing signals representative of the extent of the overlapping of the raster at opposite ends of said second axis for deriving control signals representative of the second axis size and centering of the raster.

10. An imaging system according to claim 1 in which said frame is adapted to be in an overlapping relationship with the four sides of the raster and in which the comparison means includes a first comparator circuit for comparing the signals representative of the extent of overlapping of a $x$ coordinate axis with a signal indicative of the desired extent of overlapping along the $x$ coordinate axis, a second comparator circuit for comparing the signals representative of the extent of overlapping along a $y$ coordinate axis with a signal indicative of the desired extent of overlapping along the $y$ coordinate axis, a third comparator circuit for comparing the signals representative of the extent of overlapping of the raster at the opposite ends of the $x$ coordinate axis and a fourth comparator circuit for comparing the signals representative of the extent of overlapping at opposite ends of the $y$ coordinate axis for deriving control signals representative of the $x$ coordinate and $y$ coordinate size and centering of the raster.

11. An imaging system according to claim 10 in which the frame bordering desired areas of the electrical image is in the form of a grating which produces an electrical signal in response to the overlapping by the raster of the spacing between the lines of the grating and which produces no electrical signals in response to the overlapping by the raster of the lines of the grating themselves.

12. An imaging system according to claim 10 in which the frame bordering desired areas of the electrical image is in the form of a combined band having a first portion which produces electrical signals when overlapped by the raster and having a second portion which produces no electrical signals when overlapped by the raster.

13. An imaging system according to claim 3 in which said frame is adapted to be in an overlapping relationship with the two sides of the raster parallel to a first axis and in which the comparison means includes a first comparator circuit for comparing signals representative of the extent of overlapping along a second axis, orthogonal to said first axis, with a signal representative of the desired extent of overlapping along said second axis for deriving control signals representative of the size raster along said second axis.

14. An imaging system according to claim 3 in which said frame is adapted to be in an overlapping relationship with at least the two sides of the raster parallel to a first axis and in which the comparison means includes a first comparator circuit for comparing signals representative of the extent of overlapping of the raster at opposite ends of said first axis for deriving control signals representative of the first axis centering of the raster.

References Cited

UNITED STATES PATENTS

| | | | |
|---|---|---|---|
| 2,613,263 | 10/1952 | Hilburn | 178—7.2 |
| 3,126,447 | 3/1964 | Bendell | 178—5.4 |
| 3,182,224 | 5/1965 | Stone et al. | 315—21 |
| 3,210,597 | 10/1965 | Siegmund et al. | 315—21 |

FOREIGN PATENTS

| | | |
|---|---|---|
| 776,764 | 6/1957 | Great Britain. |

ROBERT L. GRIFFIN, *Primary Examiner.*

JOHN W. CALDWELL, *Examiner.*

R. K. ECKERT, *Assistant Examiner.*